United States Patent Office 3,322,680
Patented May 30, 1967

3,322,680
POLYMERIC COMPOSITIONS CONTAINING A FLUORESCENT BRIGHTENING AGENT
David G. Hedberg, Melvin S. Bloom, and Marshall V. Otis, Kingsport, Tenn., assignors to Eastman Kodak Company, Rochester, N.Y., a corporation of New Jersey
No Drawing. Filed Mar. 8, 1963, Ser. No. 263,742
Claims priority, application Great Britain, Dec. 17, 1962, 47,527/62
The portion of the term of the patent subsequent to July 12, 1983, has been disclaimed
20 Claims. (Cl. 252—301.2)

This invention relates to novel compositions of matter, to articles of manufacture made therefrom and more particularly to novel filaments, fibers, sheets, films and other shaped articles, made of natural or synthetic materials, having unexpected brightness and/or whiteness.

The novel compositions within the scope of our invention contain at least one fluorescent 4,4'-bis(benzoxazol-2-yl)stilbene compound as a fluorescent brightening agent.

Fibers, films and shaped articles made of normally translucent or transparent synthetic materials, and particularly of polymeric materials such as regenerated cellulose, rayon cellulose esters, polyesters, polyamides, polyolefins, polyacrylics and modacrylics, polyurethanes, etc. have an inherent yellowish color which becomes more pronounced as the material ages. The yellowish color is apparent in uncolored or undyed articles made of these materials. In the case of dyed or colored articles made from these materials, the inherent yellow color causes a diminished brightness which becomes more pronounced as the material ages.

It is therefore an object of this invention to provide novel compositions and shaped articles therefrom which overcome many of the disadvantages of prior art compositions and articles as regards whiteness and/or brightness.

It is a further object of this invention to increase the utility of many natural and synthetic materials for use in fibers, filaments, sheets, films and other shaped articles by increasing their brightness without concomitant loss of other desirable properties. Other objects will be apparent from the description and claims which follow, and these and other objects are accomplished by means of this invention as described more fully hereinafter with particular reference to certain preferred embodiments thereof.

We have found, unexpectedly, that the brightness, and/or whiteness of uncolored articles, of the materials indicated hereinbefore can be increased by adding to these materials at least one fluorescent 4,4'-bis(benzoxazol-2-yl) stilbene compound of the formula:

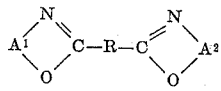

wherein R is a substituted or unsubstituted bivalent 4,4'-stilbene radical and $A^1$ and $A^2$ each are a substituted or unsubstituted o-phenylene radical.

The increased brightness and/or whiteness of these materials is unexpectedly long lasting and is highly resistant to light, heat, washing, sublimation, crocking, textile processing baths, dye baths, dry cleaning, bleaches, etc.

The compositions embodying our invention are unexpectedly superior to the prior art compositions containing a fluorescent brightening agent. Many prior art compositions containing a fluorescent brightening agent often exhibit undesirable colors because of the intrinsic color of the brightening agent or because of fluorescence at undesirable wave-lengths. Other prior art compositions containing a fluorescent brightening agent are unstable to one or more of the following: heat, light, washing, dry cleaning, bleaches, textile processing, etc. and discolor with use. However, the novel compositions embodying our invention exhibit a remarkable combination of properties in that they possess a superior brightness and/or whiteness of highly desirable hue which is unexpectedly stable to light, heat, sublimation, crocking and the processing and cleaning procedures referred to hereinbefore. Furthermore, the physical properties of the novel colored and uncolored compositions embodying our invention are not deleteriously affected by the presence of the fluorescent 4,4'-bis-(benzoxazol-2-yl)stilbene compound in the composition.

The outstanding properties of articles and compositions embodying our invention are not primarily dependent on the way in which the fluorescent 4,4'-bis(benzoxazol-2-yl)stilbene compound is incorporated therein. For example, incorporating the compound in polymer prior to extrusion or spinning gives particularly good results as does incorporation during the process of polymer manufacture.

Thus, the stilbene compounds described herein can be incorporated in the base material by disperse dyeing procedures; that is, by immersing the substrate or article in an aqueous dispersion of a fluorescent 4,4'-bis(benzoxazol-2-yl)stilbene compound.

Synthetic fibers, films or the like prepared by melt spinning or extrusion can be prepared by incorporating a fluorescent 4,4'-bis(benzoxazol-2-yl)stilbene compound, either directly or as a master batch, into the melt from which the article is spun or extruded.

Solution spun fibers having outstanding brightness and whiteness which is unexpectedly long lasting can be made by adding a fluorescent 4,4'-bis(benzoxazol-2-yl)stilbene compound to the solution from which the fiber is spun. Cast films having outstanding brightness and/or whiteness which is unexpectedly long lasting can be made by adding a fluorescent 4,4'-bis(benzoxazol - 2 - yl)stilbene compound to the solution from which the film is cast.

The fluorescent 4,4'-bis(benzoxazol-2-yl)stilbene compound can also be mixed with a molding powder in a conventional mixer. In the case of certain low melting polymers such as polyolefins, the polymer and a fluorescent 4, 4'-bis(benzoxazol-2-yl)stilbene compound can be milled together on hot rolls.

Suitable fluorescent 4,4'-bis(benzoxazol-2 - yl)stilbene compounds for use in practicing our invention are compounds of the formula

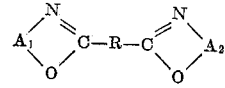

having a suitable Relative Fluorescence Index, as determined relative to a quinine sulfate standard reference, as will be discussed in detail hereinafter, and of a desirable high level.

In the above formula R is a bivalent 4,4'-stilbene radical of the formula

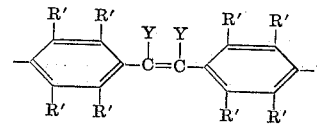

and $A_1$ and $A_2$ are each an o-phenylene radical of the formula

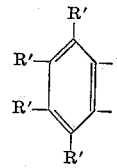

The substituents R' of the bivalent 4,4'-stilbene radical and of each of the o-phenylene radicals can be the same or different monovalent substituents bound to the ring by a covalent bond and can be any such substituent which does not destroy the desirable fluorescent properties of the 4,4'-bis(benzoxazol-2-yl)stilbene compound. The substituent Y and Y' of the 4,4'-stilbene radical can be the same or different monovalent substituents bound to the respective carbon atoms to which they are attached by a covalent bond and can be any such substituent which does not destroy the desirable fluorescent properties of the 4,4'-bis(benzoxazol-2-yl)stilbene compound.

Typical monovalent substituents Y and Y' which are suitable include a hydrogen atom and alkyl, aryl and cyano radicals. When Y or Y' is alkyl it is preferably alkyl of 1 to 18 carbon atoms such as methyl, ethyl, n-butyl, i-butyl, 2-ethylhexyl, n-pentyl, n-hexyl, n-decyl, dodecyl or cetyl, for example. When Y or Y' is aryl it is preferably mononuclear aryl such as phenyl, methylphenyl, methoxyphenyl, ethylphenyl, chlorophenyl and bromophenyl for example.

Typical monovalent substituents R' which are suitable include a hydrogen atom, a halogen atom and alkyl, aryl, substituted aryl, hydroxy, alkoxy, aryloxy, acyl, acyloxy, amino, substituted amino, quaternized ammonium, sulfo, substituted sulfonyl, sulfamyl, substituted sulfamyl, cyano, thiocyano, thiol, carbamyl, substituted carbamyl, carbamoyloxy, and nitro groups, for example. The monovalent substituents named are illustrative, and not limitative, because, as noted, any monovalent substituent bound to the ring by a covalent bond which does not destroy the desirable fluorescent properties of the 4,4'-bis(benzoxazol-2-yl)stilbene compound can be present.

Chlorine, bromine, fluorine and iodine atoms are illustrative of the halogen atoms represented by R'. When R' is alkyl it preferably has 1 to 18 carbon atoms, such as methyl, ethyl, propyl, isopropyl, n-butyl, isobutyl, n-pentyl, n-hexyl, n-decyl, n-dodecyl, n-hexadecyl, or n-octadecyl, for example. When R' is aryl or substituted aryl it is preferably mononuclear aryl such as phenyl, methylphenyl, ethylphenyl, chlorophenyl, bromophenyl, methoxyphenyl, ethoxyphenyl or other substituted phenyl nuclei. However, R' can also be an aryl nucleus such as 1-naphthyl or 2-naphthyl and substituted derivatives thereof, furyl, thienyl, etc. for example. Illustrative of the alkoxy groups represented by R' are alkoxy groups having from 1 to 18 carbon atoms, and preferably from 1 to 4 carbon atoms, such as methoxy, ethoxy, propoxy, isopropoxy, n-butoxy, isobutoxy, n-amoxy, isoamoxy and hexoxy, for example. Phenoxy and naphthoxy are illustrative aryloxy groups represented by R'. Formyl, acetyl, propionyl, butyryl, isobutyryl, benzoyl and naphthoyl, for example are illustrative of the acyl groups represented by R'. Acetoxy, benzoxy, CH$_3$CH$_2$COO—,

CH$_3$CH$_2$CH$_2$COO— and CH$_3$CH$_2$CH$_2$CH$_2$CH$_2$COO—, for example, are illustrative of the acyloxy groups represented by R'. Monoalkylamino, dialkylamino, wherein the alkyl groups are the same or different, arylamino, aralkylamino, cycloalkylamino, monohydroxyalkylamino, dihydroxy-alkylamino, alkoxyalkylamino and other aliphaticamino groups, for example are illustrative of the substituted amino groups represented by R'. Normally the alkyl, hydroxyalkyl or alkoxyalkyl groups present in such amino groups contain no more than 4 carbon atoms although they can contain more.

Illustrative of the substituted sulfonyl groups represented by R' are alkylsulfonyl groups having from 1 to 18 carbon atoms and preferably from 1 to 4 carbon atoms such as methylsulfonyl, ethylsulfonyl, propylsulfonyl, butylsulfonyl, etc. and arylsulfonyl, preferably mononuclear arylsulfonyl such as phenylsulfonyl, methylphenylsulfonyl, chlorophenylsulfonyl and ethoxyphenylsulfonyl.

Illustrative of the substituted sulfamyl groups represented by R' are alkyl and dialkylsulfamyl such as N,N-dimethylsulfamyl, N,N-diethylsulfamyl, N,N-dipropylsulfamyl, N-ethylsulfamyl, N-methylsulfamyl, N-butylsulfamyl, and N-ethyl-N-butylsulfamyl; aryl and diarylsulfamyl such as N-phenyl-sulfamyl, N,N-diphenylsulfamyl, N,N-di(ethylphenyl)sulfamyl; N - phenyl - N - (ethylphenyl)sulfamyl, N,N-di(butylphenyl)sulfamyl and N-(ethoxyphenyl)sulfamyl; N-alkyl-N-arylsulfamyl such as N-ethyl-N-phenylsulfamyl, N-methyl-N-methoxyphenylsulfamyl and N-butyl-N-chlorophenylsulfamyl.

Illustrative of the substituted carbamyl groups represented by R' are alkylcarbamyl and dialkylcarbamyl groups wherein the alkyl radicals preferably contain from 1 to 4 carbon atoms, such as N-methylcarbamyl, N-ethylcarbamyl, N-propylcarbamyl, N-isopropylcarbamyl, N-butylcarbamyl, N,N-dimethylcarbamyl, N,N-diethylcarbamyl, N,N-dibutylcarbamyl and N-ethyl-N-methylcarbamyl; aryl and diarylcarbamyl such as N-phenylcarbamyl N,N - diphenylcarbamyl, N,N - (diethylphenyl)carbamyl and N,N-di(methoxyphenyl)carbamyl.

R' can also be a

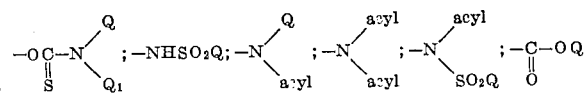

or a

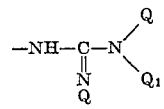

group, for example, wherein Q and Q$_1$ each are a hydrogen atom, an alkyl group (preferably having 1 to 4 carbon atoms), a substituted alkyl group (preferably having no more than 4 carbon atoms), an aryl group (such as phenyl, methylphenyl, ethylphenyl, methoxyphenyl, ethoxyphenyl, chlorophenyl or bromophenyl, for example) and a cycloalkyl group (such as cyclobutyl, cyclopentyl or cyclohexyl).

The term acyl, unless otherwise indicated, is used broadly and includes, in addition to the acyl groups noted hereinbefore, groups such as the ureido group, —SO$_2$Q groups and

groups, wherein Q and Q$_1$ have the meaning previously assigned to them.

R' can also be a fluorinated alkyl group having 1 to 18 carbon atoms. Difluoroalkyl groups having the formula —(CH$_2$)$_n$CF$_2$ and trifluoroalkyl groups having the formula —(CH$_2$)$_n$CF$_3$ wherein $n$ is a whole number from 1 to 17 are illustrative. Higher fluorinated alkyl groups such as —(CH$_2$)$_{m_1}$—(CF$_2$)$_m$—CF$_3$ wherein $m$ is 1 to 4, for example, and m$_1$ is 1 or 2, can also be present. 2,2-difluoroethyl, 3,3-difluoro-n-propyl, 4,4-difluoro-n-butyl, 5,5-difluoro-n-amyl, 6,6-difluoro-n-hexyl, 2,2,2-trifluoroethyl, 3,3,3 - trifluoro - n - propyl, 4,4,4 - trifluoro - n-butyl, 5,5,5-trifluoro-n-amyl, 6,6,6-trifluoro-n-hexyl,

—CH$_2$CH$_2$CF$_3$

—CH$_2$CH$_2$CF$_2$CF$_3$; —CH$_2$CH$_2$CH$_2$CF$_2$CF$_3$ and

—CH$_2$CH$_2$CF$_2$CF$_2$CF$_3$ are illustrative of the fluorinated alkyl groups which R' can be.

R' can also be an unsaturated acyclic hydrocarbon radical such as alkyl, 1-butenyl, 2-butenyl, 3-butenyl, 1-pentenyl, 2-pentenyl, 3-pentenyl, isobutenyl and 1-isopentenyl for example.

R', Y and Y' are not limited to the particular substituents noted herein. As stated hereinbefore R', Y and Y' can be any monovalent substituent, bound by a covalent bond, so long as the Relative Fluorescence Index, described hereinafter, of the compound as measured relative to a quinine sulfate standard reference is of a desirable high level.

Normally no more than 1 of the R' substituents present in each of the phenyl nuclei of the bivalent 4,4'-stilbene radical is other than a hydrogen atom. The simpler 4,4'-bis(benzoxazol-2-yl)stilbene compounds are preferred because they are cheaper, more easily prepared and equally good or better fluorescent brightening agents than the more complex 4,4'-bis(benzoxazol-2-yl)stilbene compounds.

On the basis of our research work the five most important 4,4'-bis(benzoxazol-2-yl)stilbene compounds for use in the novel compositions of our invention are 4,4'-bis(benzoxazol - 2 - yl)stilbene, 4,4' - bis(5 - methoxybenzoxazol - 2 - yl)stilbene, 4,4' - bis(6 - methylsulfonylbenzoxazol - 2 - yl)stilbene, 4,4' - bis(5 - cyanobenzoxazol-2-yl)stilbene and 4,4'bis(6-chlorobenzoxazol-2-yl)stilbene.

The 4,4'-bis(benzoxazol-2-yl)stilbene compounds employed in the practice of our invention are novel compounds. They are described and claimed in Saunders U.S. application Ser. No. 273,283, filed Apr. 16, 1963, now Patent No. 3,260,715.

The fluorescent 4,4'-bis(benzoxazol-2-yl)stilbene compounds which are useful in the practice of our invention can be prepared by converting a stilbene dicarboxylic acid to the corresponding stilbene dicarboxylic acid chloride, for example by reacting a stilbene dicarboxylic acid with thionyl chloride and phosphorus pentachloride according to the method disclosed by Hager et al., J.A.C.S., 68, 2167 (1946). The 4,4'-stilbene dicarboxylic acid chloride can then be reacted with an o-amino-phenol in the presence of a solvent such as dioxan to yield a 4,4'-bis(2-hydroxyphenylcarbamoyl)stilbene which, when heated under a vacuum, yields the desired 4,4'-bis(benzoxazol-2-yl)stilbene.

The desired 4,4'-stilbene dicarboxylic acid can be prepared by a number of methods. One is the method disclosed in Toland et al., J.A.C.S. 75, 2263 (1953) and U.S. 2,610,191 which comprises reacting a p-toluic acid with sulfur. Another is the method of Harris, J.C.S. 1947, 690 which comprises condensing a 4-bromophenylacetate with a 4-bromobenzaldehyde to give a 4,4'-dibromostilbene-$\alpha$-carboxylic acid which is converted to the desired 4,4'-stilbene dicarboxylic acid. Another method comprises condensing a p-cyanobenzaldehyde with a p-cyanobenzylcyanamide according to the method of Bell et al., J.C.S. 1948, 1024 to give a 4,4'-$\alpha$-tricyanostilbene which is converted to an $\alpha$-cyanostilbene dicarboxylic acid.

The fluorescent stilbene compounds herein defined can be used to brighten and/or whiten any of the transparent or translucent fiber or film forming synthetic resins or polymers. Thus, suitable base materials for preparation of the novel articles of manufacture within the scope of our invention include any of the natural or synthetic materials normally used for making fibers, filaments, sheets, films, molded and extruded articles or the like, and the invention is particularly useful for polymeric materials such as polyolefins, such as polyethylene, polypropylene and polyallomer; polyesters such as poly(ethyleneterephthalate), poly(1,4 - cyclohexylenedimethyleneterephthalate, and poly(ethylenenaphthalenedicarboxylate) or modifications of such polyesters which may contain other bifunctional materials, dyeing adjuvants, etc.; polyacrylonitriles including modacrylics; polyurethanes; rayon; cellulose esters such as cellulose acetate, cellulose triacetate, cellulose acetate butyrate, polyamides; elastomeric polyesters, and other fiber or film forming materials. The materials named are merely illustrative and not limitative of the polymeric materials that can be brightened and/or whitened in accordance with out invention.

The effective concentration of fluorescent 4,4'-bis-(benzoxazol-2-yl)stilbene compound in or on the substrate, can be varied widely and depends upon the color of the undyed base material and the Relative Fluorescence Index of the particular fluorescent 4,4'-bis(benzoxazol-2-yl)stilbene compound. In general, we have found that especially useful results are obtained at concentrations of about 0.005 percent to about 0.5 percent by weight of the fluorescent 4,4'-bis(benzoxazol-2-yl)stilbene compound based on the weight of the material treated. However, higher or lower concentrations of the fluorescent 4,4'-bis (benzoxazol-2-yl)stilbene compound are also useful and may be preferred in certain instances.

Particularly good results are obtained with poly(ethyleneterephthalate) fibers or films containing from 0.01% to 0.05% of 4,4'-bis(benzoxazol-2-yl)stilbene; 4,4'-bis (6-methylsulfonylbenzoxazol-2-yl)stilbene or 4,4'-bis(5-methoxybenzoxazol - 2 - yl)stilbene; poly(1,4 - cyclohexylenedimethyleneterephthalate) fibers containing from 0.01% to 0.05% of 4,4'-bis(benzoxazol-2-yl)stilbene; 4,4'-bis(6-methylsulfonylbenzoxazol-2-yl)stilbene or 4,4'-bis(5-methoxybenzoxazol-2-yl)stilbene; cellulose acetate fibers containing from 0.01% to 0.05% of 4,4'-bis(benzoxazol - 2 - yl)stilbene; 4,4' - bis(6 - methylsulfonylbenzoxazol - 2 -yl)stilbene or 4,4' - bis(5 - methoxybenzoxazol-2-yl)stilbene; cellulose acetate butyrate articles containing from 0.01% to 0.1% of 4,4'-bis(benzoxazol-2-yl)-stilbene; 4,4' - bis(6 - methylsulfonylbenzoxazol - 2 - yl)-stilbene or 4,4' - bis(5 - methoxybenzoxazol - 2 - yl)stilbene; fibers of a copolymer comprising acrylonitrile and vinylidene chloride containing from 0.01% to 0.05% of bis(benzoxazol - 2 - yl)stilbene; 4,4' - bis(6 - methylsulfonylbenzoxazol - 2 - yl)stilbene or 4,4' - bis(6 - chlorobenzoxazol - 2 -yl)stilbene or 4,4'-bis(5 - methoxybenzoxazol-2-yl)stilbene; polyethylene articles containing from 0.01% to 0.05% of 4,4'-bis(benzoxazol-2-yl)stilbene; 4,4' - bis(6 - methylsulfonylbenzoxazol - 2 - yl)stilbene or 4,4' - bis(6 - methoxybenzoxazol - 2 - yl)stilbene; polypropylene articles containing from 0.01% to 0.05% of 4,4'-bis(benzoxazol-2-yl)stilbene; 4,4'-bis(methylsulfonylbenzoxazol - 2 - yl)stilbene or 4,4' - bis(5 - methoxybenzoxazol-2-yl)stilbene; polyallomer articles containing from 0.01% to 0.05% of 4,4'-bis(benzoxazol-2-yl)stilbene; 4,4' - bis(6 - methylsulfonylbenzoxazol - 2 - yl)-stilbene or 4,4' - bis(5 - methoxybenzoxazol - 2 - yl)-stilbene; and elastomeric fibers comprising a copolyester of a cyclic dicarboxylic acid, cyclohexanedimethanol and a copolyether glycol containing from 0.01% to 0.05% of 4,4' - bis(benzoxazol - 2 - yl)stilbene; of 4,4' - bis(6-methylsulfonylbenzoxazol - 2 - yl)stilbene or 4,4' - bis(5-methoxybenzoxazol-2-yl)stilbene.

The invention is illustrated by the following examples which are included for purposes of illustration only and which are not intended to limit the scope of the invention unless specifically indicated.

*Example 1*

A poly(ethyleneterephthalate) composition containing 4,4'-bis(benzoxazol-2-yl)stilbene is prepared by mixing 0.40 part by weight of 4,4'-bis(benzoxazol-2-yl)stilbene with 100 parts by weight of poly(ethyleneterephthalate) polyester powder and 7.0 parts by weight of titanium dioxide to form a "master batch." The "master batch" mixture is melted and extruded into rods which are cut into pellets. The master batch pellets are mixed with pellets of poly(ethyleneterephthalate) in the ratio of one part by by weight of "master batch" pellets per 19 parts by weight of poly(ethyleneterephthalate) pellets. The resulting mixture of pellets is melted and extruded through a spinneret to form a white poly(ethyleneterephthalate) fiber containing about 0.02 weight percent 4,4'-bis(benzoxazol-2-yl)stilbene. The poly(ethyleneterephthalate) fiber exhibits superior whiteness in daylight and a blue fluorescence in the presence of ultraviolet light.

*Example 2*

A mixture is prepared by dry mixing 0.010 part by weight of 4,4'-bis(benzoxazol-2-yl)stilbene with 100 parts by weight of poly(1,4-cyclohexylenedimethyleneterephthalate) polyester granules containing 0.35 weight percent of titanium dioxide. The mixture, when melted and extruded through a spinneret, forms a white poly(1,4-cyclohexylenedimethylenephthalate) fiber containing about 0.010 weight percent 4,4'-bis(benzoxazol-2-yl)stilbene and exhibiting superior whiteness in daylight and a blue fluorescence in the presence of ultraviolet light.

Example 3

The fibers of Examples 1 and 2 exhibit superior whiteness in daylight. They are stable to textile processing and are essentially unchanged in hue after over 60 hours exposure in the Fade-Ometer. The superior whiteness of the fibers is also essentially unchanged after being subjected to the gas-fading, perspiration, sublimation, crocking, washing and dry cleaning tests conducted in accordance with the procedure given in the 1962 Technical Manual of the American Association of Textile Chemists and Colorists.

Example 4

A 100% polyester tropical fabric woven from poly(ethyleneterephthalate) was dyed with 0.05% by weight of the fabric of 4,4'-bis(6-methylsulfonylbenzoxazol-2-yl)stilbene by the Thermosol process described by Gibson et al. in "American Dyestuff Reporter," 42, 1 (1953). The dyed fabric had superior whiteness which was essentially unchanged by a series of tests simulating textile processing steps. The superior whiteness of the fabric was also virtually unchanged when subjected to the tests described in Example 3.

Example 5

The white polyester fiber prepared in Example 2 was woven into a tropical fabric and dyed with 0.088% by weight of the fabric of 4-(4'-β-hydroxyethylanilino)-5-nitro-1,8-dihydroxyanthraquinone in admixture with sodium lignin sulfonate and Igepon T by the carrier dying procedure described by Ivey in "American Dyestuff Reporter" 48, 3 (1959). The resulting blue fabric exhibited superior brigness over a similarly dyed fabric made from poly(1,4 - cyclohexylenedimethyleneterephthalate) fibers having no optical brighteners. The color fastness properties of the two dyed fabrics were identical.

Example 6

A white polyamide fabric containing 4,4'-bis-(benzoxazol-2-yl)stilbene was prepared by immersing a fabric woven from a white polyamide fiber at 95° C. for one hour in a 30/1 bath containing 1% of the weight of the fabric of 4,4'-bis-(benzoxazol-2-yl)stilbene dispersed with sodium lignin sulfonate and Igepon T in the usual manner for the application of disperse dyes. The resulting fabric had superior whiteness. It was characterized by a blue fluorescence in the presence of ultraviolet light and the fluorescence had excellent fastness properties.

Example 7

Polyethylene shaped articles were prepared by dry mixing 0.02 part by weight of 4,4'-bis(6-methylsulfonylbenzoxazol-2-yl)stilbene and injection molding the result mixture at 180° C. The molded polyethylene articles had an intense blue fluorescence in ultraviolet light which gave the appearance of improved whiteness in daylight. The improved whiteness was exceptionally stable to light and heat.

Example 8

An elastomeric polyester containing 4,4'-bis-(benzoxazol-2-yl)stilbene was prepared by mixing 0.02 part by weight of 4,4'-bis(benzoxazol-2-yl)stilbene with 100 parts by weight of a copolyester of tetephthalic acid, 1,4-cyclohexanedimethanol and poly(tetramethylene glycol). The resulting mixture was melt spun into a white elastomeric polyester fiber having improved whiteness which had superior fastness.

Example 9

A red cellulose acetate fiber containing about 0.02% by weight of 4,4'-bis(6-methylsulfonylbenzoxazol-2-yl)stilbene was prepared by ball milling 0.58 parts by weight of Watchung Red and 0.0058 part by weight of 4,4'-bis(6-methylsulfonylbenzoxazol-2-yl)stilbene into 100 parts of 29% cellulose acetate-acetone dope and spinning the resulting dope into red fibers. The red fibers were considerably brighter than similar red fibers not containing 4,4'-bis(6-methylsulfonylbenzoxazol-2-yl)stilbene.

Example 10

A clear sheet of cellulose acetate butyrate was prepared by milling together 0.1 part of 4,4'bis(benzoxazol-2-yl)stilbene with 100 parts of cellulose acetate butyrate and 5 parts of dioctyl phthalate on hot rolls at 250° F. and pressing the resulting plastic mass between metal platens at 250° F. The clear sheet had a permanent intense blue fluorescence.

Example 11

A modacrylic fiber containing 4,4'-bis(6-chlorobenzoxazol-2-yl)stilbene was prepared by incorporating 0.02 part of 4,4'-bis(6-chlorobenzoxazol-2-yl)stilbene into a solution containing 18 parts of poly-N-isopropylacrylamide and 82 parts of a copolymer of acrylonitrile and vinylidene chloride and spinning the mixture into a fiber. The resulting fiber had superior fluorescence properties of excellent fastness.

Example 12

White fibers of cellulose acetate, cellulose triacetate, polyacrylonitrile, Lycra elastomeric polyester and Vyrene elastomeric polyurethane containing 4,4'-bis(benzoxazol-2-yl)stilbene were prepared by incorporating 0.02 part by weight of 4,4'-bis(benzoxazol-2-yl)stilbene into 100 parts by weight of polymer prior to spinning the polymer into a white fiber. In each case, the resulting fibers had improved whiteness of excellent fastness properties.

Example 13

White fibers of cellulose acetate, cellulose triacetate, polyacrylonitrile, Lycra elastomeric polyester and Vyrene elastomeric polyurethane containing 4,4'-bis(6-methylsulfonylbenzoxazol-2-yl)stilbene were prepared by incorporating 0.02 part by weight into 100 parts by weight of polymer prior to spinning the polymer into a white fiber. In each case the resulting fibers had improved whiteness and excellent fastness properties.

Example 14

Sheets of polypropylene, polyethylene and polyallomer containing 4,4'-bis(benzoxazol-2-yl)stilbene were prepared by incorporating 0.02 part by weight of 4,4'-bis-(benzoxazol-2-yl)stilbene into 100 parts of polymer and pressing into a sheet according to the method of Example 10. In each instance the sheet exhibited a permanent blue fluorescence.

Example 15

Sheets of polypropylene, polyethylene, polyallomer and cellulose acetate butyrate containing 4,4'-bis-(6-methylsulfonylbenzoxazol-2-yl)stilbene were prepared by incorporating 0.02 part by weight of 4,4'-bis(6-methylsulfonylbenzoxazol-2-yl)stilbene into 100 parts of polymer and pressing into a sheet according to the method of Example 10. In each case the sheet exhibited a permanent blue florescence.

The following examples illustrate the preparation of typical 4,4'-bis(benzoxazol)stilbene compounds that are useful in the practice of our invention.

Example 16.—4,4'-bis(benzoxazol-2-yl)stilbene 4,4'-stilbenedicarboxylic acid was prepared from p-toluic acid by the method of J.A.C.S., 1953, 75, 2263. 4,4'-stilbenedicarboxylic acid chloride was prepared from the 4,4′-stilbenedicarboxylic acid according to the method of J.A.C.S., 1946, 68, 2167.

4,4′-bis(2-hydroxyphenylcarbamoyl)stilbene was prepared by dissolving the 4,4′-stilbenedicarboxylic acid chloride (1.5 grams) in hot dioxane (50 ml.) and adding o-aminophenol (1.1 grams) dissolved in dioxane (5 ml.) to the solution. An immediate precipitate came down. The mixture was refluxed 2 hours to complete the reaction, cooled and 1.8 grams of a brown precipitate decomposing at 300–320° C. was collected. The brown precipitate of 4,4′-bis(2-hydroxyphenylcarbamoyl)stilbene (1.8 grams) was heated under vacuum in an oil bath at 320–340° until the reaction subsided. The product was cooled under vacuum and Soxhlet extracted with benzene. From the benzene solution crystallized lustrous yellow flakes of 4,4′-bis(benzoxazol-2-yl)stilbene (0.93 gram), M.P. 365–8°.

Analysis.—Found: C, 81.3%; H, 4.60%; N, 6.65%. $C_{28}H_{18}N_2O_2$ requires C, 81.2%; H, 4.35%; N, 6.77%.

*Example 17.—4,4′-di-(benzoxazol-2-yl)-2-methylstilbene*

2-methyl-4,4′-stilbenedicarboxylic acid chloride was prepared from the corresponding acid according to the method of J.A.C.S., 68, 2167 (1946). The acid was obtained by hydrolysis of the dinitrile [J.A.C.S., 68, 2167 (1946)] which in turn was prepared according to the procedure of J.C.S. (1947), 690 (41 C.A. 6229a).

2-methyl-4,4′-stilbene dicarboxylic acid chloride (3.2 g.) (0.01 mole) was dissolved in hot dioxane (100 ml.) and o-aminophenol (2.2 g.) (0.02 mole) in doxane (10 ml.) added. An immediate precipitate came down. The mixture was refluxed 2 hours to complete the reaction, cooled and the precipitate collected. There was obtained 3.7 g. of light brown solid product.

The above 3.7 g. (0.008 mole) of 4,4′-di-(2-hydroxyphenylcarbamoyl)-2-methylstilbene was heated under vacuum in an oil bath at 320–340° until the reaction subsided. The product was cooled under vacuum and Soxhlet extracted with benzene. The benzene solution deposited 2.0 g. of 4,4′-di(benzoxazol-2-yl)-2-methylstilbene as yellow flakes.

*Example 18.—4,4′-di(benzoxazol-2-yl)-α-cyanostilbene*

α-Cyanostilbene dicarboxylic acid chloride was prepared from the corresponding acid according to the method of J.A.C.S., 68, 2167 (1946). The acid was obtained by the partial hydrolysis of 4,4′-α-tricyanostilbene with $H_2SO_4$ in acetic acid at 140° (J.C.S., 1948, 1024). The latter was obtained by condensing p-cyanobenzaldehyde with p-cyanobenzyl cyanide (J.C.S., 1948, 1024).

α-Cyanostilbene dicarboxylic acid chloride (3.3 g.) was dissolved in hot dioxane (100 ml.) and o-aminophenol (2.2 g.) (0.02 mole) in dioxane (10 ml.) added. The addition caused an immediate precipitate to form. The mixture was then refluxed 2 hours to complete the reaction, cooled and the final precipitate was collected. It consisted of 3.32 g. (70%) of a pale brown solid.

The above 3.32 g. of 4,4′-di-(2-hydroxyphenyl carbamoyl)-α-cyanostilbene was heated under vacuum in an oil bath at 320–340° until the reaction subsided. The product was cooled under vacuum and Soxhlet extracted with benzene. The benzene solution deposited 1.84 g. (60%) of 4,4′-di(benzoxazol-2-yl)-α-cyanostilbene as yellow flakes.

*Example 19.—4,4′-di(benzoxazol-2-yl)-2,2′-dimethylstilbene*

2,2′-dimethyl-4,4′-stilbenedicarboxylic acid chloride was prepared by reacting the corresponding acid with thionyl chloride and phosphorus pentachloride. The acid was obtained by hydrolysis of the dinitrile with 10% KOH in propylene glycol [J.A.C.S., 68, 2167 (1946)]. The dinitrile resulted from the reaction of cuprous cyanide with α-carboxy-4,4′-dibromo-2,2′-dimethylstilbene. The latter was obtained by condensing potassium 4-bromo-2-methylphenyl acetate with 4-bromo-2-methylbenzaldehyde and acetic anhydride in the presence of pyridine [J.C.S. (1948), 1024].

2,2′-dimethyl-4,4′-stilbenedicarboxylic acid chloride (3.3 g.) (0.01 mole) was dissolved in hot dioxane (100 ml.) and o-aminophenol (2.2 g.) (0.02 mole) in dioxane (10 ml.) added. After an intermediate precipitate formed, the mixture was refluxed 2 hours to complete the reaction, cooled and the precipitate collected. There was obtained 3.1 g. (65%) of pale brown leaves of product. This 3.1 g. of 4,4′-di(2″-hydroxyphenylcarbamoyl)-2,2′-dimethylstilbene was heated under vacuum in an oil bath at 320–340° until the reaction subsided. The product was cooled under vacuum and Soxhlet extracted with benzene. The benzene solution yielded yellow leaves of 4,4′-di(benzoxazol-2-yl)-2,2′-dimethylstilbene (2.75 g.).

*Example 20.—4,4′di-(6-methoxybenzoxazol-2-yl)stilbene*

4,4-stilbenedicarboxylic acid chloride (3.0 g.) prepared as in Example 3 was dissolved in hot dioxane (100 ml.) and 2-amino-5-methoxyphenol (2.78 g.) (Ber., 46, 3382) in dioxan (10 ml.) was added. After an immediate precipitate came down the mixture was refluxed 2 hours to complete the reaction, cooled and the precipitate collected.. There was obtained (3.7 g.), 75% of product.

The above 3.7 g. of 4,4′-di(2-hydroxy-5-methoxy-phenyl-carbamoyl)-stilbene was heated under vacuum in an oil bath at 320–340° until the reaction subsided. The product was cooled under vacuum and Soxhlet extracted with benzene. From the benzene solution there crystallized 2.28 g. of yellow flakes of 4,4′-di(6-methoxybenzoxazol-2-yl)stilbene.

*Example 21.—4,4′-di(benzoxazol-2-yl)-2-nitrostilbene*

2-nitro-4,4′-stilbenedicarbonyl chloride was prepared from the corresponding acid and dinitrile according to the method of J.A.C.S., 68, 2167 (1946). The dinitrile was obtained by condensing 4-methyl-3-nitrobenzonitrile with 4-cyanobenzaldehyde according to U.S. Patent 2,510,047, C.A., 44: P 9482b.

2-nitro-4,4′-stilbenedicarbonyl chloride (3.5 g.) was dissolved in hot dioxane (100 ml.) and o-aminophenol 2.2 g. in dioxan (10 ml.) was added. After refluxing 2 hours to complete the reaction, the mixture was cooled and the precipitate collected. There was obtained 3.0 g. of yellow 4,4′-di(2-hydroxyphenylcarbamoyl)-2-nitrostilbene which was heated under vacuum in an oil bath at 320–340° until the reaction subsided. The product was cooled under vacuum and Soxhlet extracted with benzene. There crystallized from the benzene 2.1 g. of yellow leaves of 4,4′-dibenzoxazol-2-yl)-2-nitrostilbene.

*Example 22.—4,4′-di-(benzoxazol-2-yl)-2-aminostilbene*

4,4′-di-(benzoxazol-2-yl)-2-nitrostilbene (2.1 g.) prepared as in Example 21 was reduced by treating with $SnCl_2$ in concentrated hydrochloric acid. Upon working up in the usual manner for stannous chloride reductions, there was obtained 1.2 g. of yellow plates of 4,4′-di-(benzoxazol-2-yl)-2-aminostilbene.

*Example 23.—4,4′-di(benzoxazol-2-yl)-2-hydroxystilbene*

The 4,4′-di(benzoxazol-2-yl)-2-aminostilbene (1.2 g.) of Example 22 was dissolved in 17 ml. of acetic and 3 ml. of propionic acid and diazotized at 0–5° by adding dropwise with stirring an equivalent of nitrosyl sulfuric acid in 5 ml. sulfuric acid and 10 cc. of acetic-propionic acid. When diazotization was complete the reaction mixture was poured into 100 ml. of water and boiled. Cooling yielded 0.96 g. of a yellow precipitate of 4,4′-di (benzoxazol-2-yl)-2-hydroxystilbene.

*Example 24.—4,4′-di(benzoxazol-2-yl)-2-chlorostilbene*

A solution of diazotized 4,4′-di(benzoxazol-2-yl)-2-aminostilbene (6.0 g.) prepared as described in Example 23 was poured into a solution of 3 g. freshly precipitated cuprous chloride dissolved in 10 ml. concentrated HCl and 15 ml. water. The reaction mixture was boiled and then cooled to yield a yellow precipitate of 4,4'-di(benzoxazol-2-yl)-2-chlorostilbene (4.4 g.).

*Example 25.—4,4'-di(benzoxazol-2-yl)-2-cyanostilbene*

A solution of diazotized 4,4'-di(benzoxazol-2-yl)-2-aminostilbene (6.0 g.) prepared as described in Example 23 was carefully neutralized with sodium carbonate at 0–5°.

This neutralized diazonium solution was then added slowly with rapid stirring to a suspension of 5 g. of freshly precipitated cuprous cyanide in 20 ml. of water and 20 ml. of benzene. (See Organic Syntheses, Coll. Vol. I, p. 514). Upon the evolution of nitrogen, the product precipitated is partially taken up in the benzene. The precipitate and benzene layer were combined and heated. Upon cooling the benzene solution yielded 3.8 g. of 4,4'-di(benzoxazol-2-yl)-2-cyanostilbene as yellow leaflets.

*Example 26.—4,4'-bis(6-chlorobenzoxazol-2-yl)stilbene*

This compound was prepared by the method of Example 1 except that an equimolar amount of 2-amino-5-chlorophenol was used in place of the o-aminophenol in the third stage of the synthesis.

*Example 27.—4,4'-bis(6-methylsulfonylbenzoxazol-2-yl)stilbene*

This compound was prepared by the method of Example 1 except that an equimolar amount of 2-amino-5-methylsulfonylphenol was used in place of the o-aminophenol in the third stage of the synthesis.

*Example 28.—4,4'-bis(6-cyanobenzoxazol-2-yl)stilbene*

This compound was prepared by the method of Example 1 except that an equimolar amount of 2-amino-4-cyanophenol was used in place of o-aminophenol in the third stage of the synthesis.

The following tabulation sets forth additional 4,4'-bis(benzoxazol-2-yl)stilbene fluorescent brightening agents that can be used in preparing the novel compositions of our invention. These compounds can be prepared in accordance with the procedure described hereinbefore. The compounds set forth are illustrative and not limitative of the 4,4'-bis(benzoxazol-2-yl)stilbene compounds that can be employed.

(1) 4,4'-bis(6-acetylbenzoxazol-2-yl)stilbene
(2) 4,4'-bis(6-trifluoromethylbenzoxazol-2-yl)stilbene
(3) 4,4'-bis(6-carbethoxybenzoxazol-2-yl)stilbene
(4) 4,4'-bis(6-phenoxybenzoxazol-2-yl)stilbene
(5) 4,4'-bis(6-dimethylsulfamylbenzoxazol-2-yl)stilbene
(6) 4,4-bis(6-dimethylcarbamylbenzoxazol-2-yl)stilbene
(7) 4,4'-bis(6-thiocyanobenzoxazol-2-yl)stilbene (8) 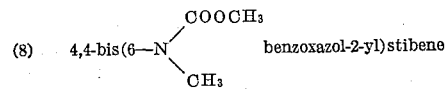

(9) 4,4'-bis(6-chloromenzoxazol-2-yl)stilbene
(10) 4,4'-bis(6-bromobenzoxazol-2-yl)stilbene
(11) 4,4'-bis(benzoxazol-2-yl)-2-methylsulfonylstilbene
(12) 4,4'-bis(benzoxazol-2-yl)-2-dimethylsulfamylstilbene
(13) 4,4'-bis(benzoxazol-2-yl)-2-acetylstilbene
(14) 4,4'-bis(benzoxazol-2-yl)-2-thiocyanostilbene
(15) 4,4'-bis(benzoxazol-2-yl)2-trifluoromethylstilbene
(16) 4,4'-bis(benzoxazol-2-yl)-2-carbomethoxystilbene

(17) 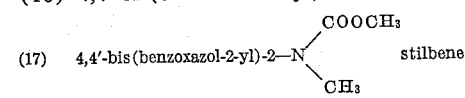

(18) 4,4'-bis(6-methoxybenzoxazol-2-yl)$\alpha,\beta$-diethylstilbene
(19) 4,4'-bis(6-chlorobenzoxazol-2-yl-$\alpha,\beta$-diethylstilbene
(20) 4,4'-bis(6-ethylsulfonylbenzoxazol-2-yl)-$\alpha,\beta$-diethylstilbene
(21) 4,4'-bis(6-dimethylsulfamylbenzoxazol-2-yl)-$\alpha,\beta$-diethylstilbene
(22) 4,4'bis(6-dimethylcarbamylbenzoxazol-2-yl)-$\alpha,\beta$-diethylstilbene
(23) 4,4'-bis(6-trifluoromethylbenzoxazol-2-yl)-$\alpha,\beta$-diethylstilbene
(24) 4,4'-bis(6-difluoromethylbenzoxazol-2-yl)-$\alpha,\beta$-diethylstilbene
(25) 4,4'-bis(6-bromobenzoxazol-2-yl)-$\alpha,\beta$-diethylstilbene
(26) 4,4'-bis(5-methoxybenzoxazol-2-yl)-$\alpha,\beta$-diethylstilbene
(27) 4,4'-bis(5-chlorobenzoxazol-2-yl)-$\alpha,\beta$-diethylstilbene
(28) 4,4'-bis(5-thiomethylbenzoxazol-2-yl)-$\alpha,\beta$-diethylstilbene
(29) 4,4'-bis(5-ethylsulfonylbenzoxazol-2-yl)-$\alpha,\beta$-diethylstilbene
(30) 4,4'-bis(5-dimethylsulfamylbenzoxazol-2-yl)-$\alpha,\beta$-diethylstilbene
(31) 4,4'-bis(5-dimethylcarbamylbenzoxazol-2-yl)-$\alpha,\beta$-diethylstilbene
(32) 4,4'bis(5-carbethoxybenzoxazol-2-yl)-$\alpha,\beta$-diethylstilbene
(33) 4,4'-bis(5-trifluomethylbenzoxazol-2-yl)-$\alpha,\beta$-diethylstilbene
(34) 4,4'-bis(5-hydroxybenzoxazol-2-yl)-$\alpha,\beta$-diethylstilbene
(35) 4,4'-bis(5-acetamidobenzoxazol-2-yl)-$\alpha,\beta$-diethylstilbene
(36) 4,4'-bis(6-methoxybenzoxazol-2-yl)-2-chlorostilbene
(37) 4,4'-bis(6-dimethylcarbamylbenzoxazol-2-yl)-2-chlorostilbene
(38) 4,4'-bis(6-acetamidobenzoxazol-2-yl)-2-chlorostilbene
(39) 4,4'-bis(6-phenoxybenzoxazol-2-yl)-2-chlorostilbene
(40) 4,4'-bis(6-bromobenzoxazol-2-yl)-2-chlorostilbene
(41) 4,4'-bis(6-cyanobenzoxazol-2-yl)-2-chlorostilbene
(42) 4,4'-bis(6-acetylbenzoxazol-2-yl)-2-chlorostilbene
(43) 4,4'-bis(6-methoxybenzoxazol-2-yl)-2-acetamidostilbene
(44) 4,4'-bis(6-acetamidobenzoxazol-2-yl)-2-acetamidostilbene
(45) 4,4'-bis(6-cyanobenzoxazol-2-yl)-2-acetamidostilbene
(46) 4,4'-bis(6-thiocyanobenzoxazol-2-yl)-2-acetamidostilbene
(47) 4,4'-bis(6-methylbenzoxazol-2-yl)-2-acetamidostilbene
(48) 4,4'-bis(6-dimethylsulfamylbenzoxazol-2-yl)-2-acetamidostilbene
(49) 4,4'-bis(6-methoxybenzoxazol-2-yl)-2-2'-dimethylstilbene
(50) 4,4'-bis(6-ethoxybenzoxazol-2-yl)-2,2'-dimethylstilbene
(51) 4,4'-bis(6-dimethylsulfamylbenzoxazol-2-yl)-2,2'-dimethylstilbene
(52) 4,4'-bis(6-thiomethylbenzoxazol-2-yl)-2,2'-dimethylstilbene
(53) 4,4'-bis(6-cyanobenzoxazol-2-yl)-2,2'-dimethylstilbene
(54) 4,4'-bis(6-acetamidobenzoxazol-2-yl)-2,2'-dimethylstilbene
(55) 4,4'-bis(5-chlorobenzoxazol-2-yl)-2-chlorostilbene
(56) 4,4'-bis(5-methoxybenzoxazol-2-yl)-2-methylstilbene

(57) 4,4'-bis(5-bromobenzoxazol-2-yl)-2-methylstilbene
(58) 4,4'-bis(5-thiomethylbenzoxazol-2-yl)-2-methylstilbene
(59) 4,4'-bis(5-dimethylsulfamylbenzoxazol-2-yl)-2-methylstilbene
(60) 4,4'-bis(5-trifluoromthylbenzoxazol-2-yl)-2-methylstilbene
(61) 4,4'-bis(5-iodobenzoxazol-2-yl)-2-methylstilbene
(62) 4,4'-bis(5-methoxybenzoxazol-2-yl)-2-cyanostilbene
(63) 4,4'-bis(5-methylbenzoxazol-2-yl)-2-cyanostilbene
(64) 4,4'-bis(5-p-methoxyphenylbenzoxazol-2-yl)-2-cyanostilbene
(65) 4,4'-bis(5-trifluoromethylbenzoxazol-2-yl)-2-cyanostilbene
(66) 4,4'-bis(5-carbomethoxybenzoxazol-2-yl)-2-cyanostilbene
(67) 4,4'-bis(5-acetamidobenzoxazol-2-yl)-2-cyanostilbene
(68) 4,4'-bis(5-cyanobenzoxazol-2-yl)-2-cyanostilbene
(69) 4,4'-bis(6-ethoxybenzoxazol-2-yl)-α-cyanostilbene
(70) 4,4'-bis(6-phenoxybenzoxazol-2-yl)-α-cyanostilbene
(71) 4,4'-bis(6-[p-methoxyphenoxy]benzoxazol-2-yl)-α-cyanostilbene
(72) 4,4'-bis(6-carbomethoxybenzoxazol-2-yl)-α-cyanostilbene
(73) 4.4'-bis(6-methoxybenzoxazol-2-yl)-α-cyanostilbene
(74) 4,4'-bis(5-ethoxybenzoxazol-2-yl)-α-cyano-2-methyl-3'-chlorostilbene
(75) 4,4'-bis(6-methoxybanzoxazol-2-yl)-α-cyano-2-methyl-3'-chlorostilbene A further illustration of the invention is given in the following example.

(76) A 250 ml. flask was charged with 29.1 g. (0.15 mole) of dimethyl terephthalate, 41 g. (0.20 mole) of a 70 percent solution of 1,4-cyclohexanedimethanol (68 percent trans isomer) in methanol, 0.0082 g. of 4,4'-bis(benzoxazol-2-yl)stilbene (0.02 percent by weight of the polyester), 0.0041 g. Monastral Blue B (0.01 percent by weight of the polyester) and 0.4 ml. of a 21 percent solution of magnesium titanium butoxide in n-butanol. The mixture was heated under nitrogen with stirring at 200-210° C. When this alcoholysis stage was completed, the temperature was raised to 305° C. and a vacuum applied as rapidly as possible. After stirring under vacuum at 305° C. for 45 minutes, the clear viscous melt was cooled under vacuum to room temperature. The final polymer was a brilliant white opaque mass with an inherent viscosity of 0.99. Fluorescent analysis of the polymer showed that the polymer contained 0.018 percent by weight of the 4,4'-bis(benzoxazol-2-yl)stilbene. Fibers were produced by the melt-spinning technique which exhibited exceptional whiteness of heretofore unobtainable stability. Films produced by melt extrusion had a permanent brilliance and permanent blue fluorescene in ultraviolet light.

For purposes of clarity it is here noted that by dimethylsulfamyl is meant the N,N-dimethylsulfamyl group having the formula —$SO_2N(CH_3)_2$. Similarly, by dimethylcarbamyl is meant the N,N-dimethylcarbamyl group having the formula —$CON(CH_3)_2$.

The numbering used herein for benzoxazole is that given in The Ring Index, Patterson, Capell and Walker, Second edition (1960), American Chemical Society. To illustrate, Compound 74, 4,4'-bis(5-ethoxybenzoxazol-2-yl)-α-cyano-2-methy-3'-chlorostilbene has the formula:

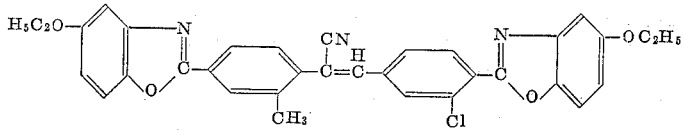

From the foregoing it is apparent that our invention provides novel compositions of matter containing one or more fluorescent 4,4'-bis(benzoxazol-2-yl)stilbene compounds which have an unexpected brightness and/or whiteness that are unusually stable, for example, to light, heat, bleaches, sublimation, crocking, dye baths, textile processing steps and aging. Compositions possessing this remarkable combination of properties are unique. The advantages of our novel compositions apply to colored as well as uncolored compositions providing superior whites and brighter colors than heretofore obtainable.

The fluorescent 4,4'-bis(benzoxazol-2-yl)stilbene compounds employed in the practice of our invention absorb ultraviolet light. They have a peak ultraviolet absorption in the range of 350 millimicrons to 390 millimicrons and have ultraviolet molar absorptivities ranging from 47,000 to 94,000 which are measured at the strongest ultraviolet absorption (lambda max). In solution or on a substrate said stilbene compounds fluoresce in the wave length region of 420–450 millimicrons which are green-blue to violet when excited in daylight or ultraviolet light. The fluorescent 4,4'-bis(benzoxazol-2-yl)stilbene compounds should impart little or no visible color to the substrate when present therein in an effective amount for whitening for brightening purposes and accordingly, should be free of substituents which would cause the stilbene compound to impart visbile color to the substrate when used in an effective amount for whitening or brightening purposes.

Further, as noted hereinbefore, the fluorescent 4,4-bis(benzoxazol-2-yl)stilbene compounds should have satisfactory stability. Thus, when incorporated in a substrate, such as those named herein, the resulting composition should have satisfactory resistance to discoloring or loss of whitening or brightening upon exposure to light, air, washing and bleaching agents such as sodium hypochlorite and calcium hypochlorite. Also, as will be described hereinafter, the stilbene compounds preferably should have a relative fluorescence index of 3.40 and greater. The relative fluorescence index number is a measure of the brightness of the fluorescent stilbene compound as a whitening or brightening agent. A compound having a satisfactory relative fluorescence index number is not necessarily a satisfactory whitening or brightening agent because it may be unstable or have too much intrinsic color, for example.

In reference to the hydrogen atoms or other substitutions on the carbon atoms in the ethylene linkage of the stilbene moiety of the compounds referred to herein such may exist in either the cis or trans configuration or mixture thereof.

The relative fluorescence index number (φR) referred to above is not general knowledge in the prior art in the field of optical brighteners. Hence, it is discussed as follows: There is a reciprocal relation between light absorption and emission from fluorescent compounds. Ideally, each absorbed light quantum would reappear as an emitted quantum, and the fluorescence yield would be unity. However, in the fluorescent compounds the emitted light has less energy and appears at longer wavelengths than the light that was absorbed. Some energy is lost as heat.

It is possible to specify the nature of the absorbed light by means of the molar absorptivity factor ($\epsilon$) which is the product of the ultraviolet absorptivity and the molecular weight of the compound. In the case of 4,4'bis(benzoxazol-2-yl)stilbene the value is 79,488. It is calculated from the observations made at the wavelength maximum $$(\lambda_{Max.}^{UV})$$

of 373 millimicrons. For the many derivatives developed in the course of this invention, the molar absorptivities have ranged from 47,000 to 94,000 and the λ max values from 350 to 390 mu.

It is possible through the application of special laboratory equipment to determine quantitative characteristics of the emitted light from fluorescent compounds, the wavelength value of the maximum emission $$(\lambda_{Max.}^{Fl})$$

and the fluorescence index number ($\phi R$). In the case of the 4,4'-bis(benzoxazol-2-yl)stilbene of the present invention these values are 432 mu. and 4.99, respectively. For the several derivatives of the compounds the emission maxima have ranged from 420 to 450 mu.

From the foregoing it may be seen that it is desirable to have as high a relative fluorescence index number as possible without developing an undesirable color hue in the polymer product. The greater the fluorescence index number the less the concentration of a given compound required to achieve a given level of brightness in the product. Therefore, compounds exhibiting a relative fluorescence index of 3.40 and above are particularly useful. However, some with lower values may be useful.

The relative fluorescence index number ($\phi R$) is computed from the expression:

$$\phi R = \frac{F_A[0.12][2]}{V_s \times C_s}$$

where:

$F_A$=relative fluorescence intensity as measured for a compound by an apparatus with a 931-A photomultiplier detector calibrated with a 2 ml. volume of aqueous quinine sulfate solution at a concentration of 20 micrograms per milliliter.
$V_s$=volume of sample in milliliters.
$C_s$=concentration in micrograms per milliliter For example, a 2-ml. volume of water solution of quinine sulfate at a concentration of 20 micrograms per milliliter has a $F_A$ value of 10.00 on the apparatus used to determine the relative index numbers. If the concentration is specified at 0.12 microgram per milliliter in an organic solvent for the experimental compounds described in this patent application and a total volume of 2 milliliters of the solution is used in the test apparatus, a sufficient range of values is available for comparing the fluorescence properties of a large number of new compounds. This technique allows for the measurement of the relative fluorescence index number for compounds that may have a higher fluorescence efficiency than the quinine sulfate standard and a higher level of luminance than quinine sulfate at a concentration of 20 micrograms per milliliter. Thus, for example, a relative fluorescence index number of 4.0 may be interpreted as stating that the compound is 40 percent as bright as quinine sulfate as determined with the experimental apparatus by the standard test conditions.

The following discussion will explain the difference between brightness and whiteness. Brightness is the luminous intensity of any surface in a given direction per unit of projected area of the surface as viewed from that direction. In common usage the term brightness usually refers to the intensity of sensation which results from viewing surfaces or spaces from which light comes to the eye.

Whiteness is the degree of approach to that extreme or limit of the series of grays which is known as white. The ideal white is obtained when a normally illuminated surface reflects all the light falling upon it. White is typically evoked by any mixture of wavelengths from a high-reflectance matt surface which approximates average daylight. A white object is one which, if illuminated by white light, will appear without hue to the average normal eye. The foregoing is in accordance with "Comparative List of Color Terms," a report of the Inter-Society Color Council, January 1949.

Our invention has been described in considerable detail with particular references to certain preferred embodiments thereof, but it will be understood that variations and modifications can be effected within the spirit and scope of the invention as described hereinabove, and as defined in the appended claims.

We claim:

1. A normally solid, fiber and film-forming polymeric material having incorporated therein about 0.005 to about 0.5 weight percent, based upon the weight of said polymeric material, of a fluorescent compound of the formula:

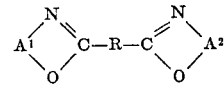

in which R is a bivalent 4,4'-stilbene radical and each of $A^1$ and $A^2$ is an o-phenylene radical.

2. A normally solid, fiber and film-forming polymeric material selected from the group consisting of:
    (a) a polyester material,
    (b) a polyolefin material,
    (c) a cellulose ester material,
    (d) a polyamide material and
    (e) a polyacrylonitrile material
having incorporated therein about 0.005 to about 0.5 weight percent, based upon the weight of said polymeric material, of a fluorescent compound of the formula:

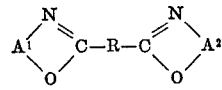

in which R is a bivalent 4,4'-stilbene radical and each of $A^1$ and $A^2$ is an o-phenylene radical.

3. A normally solid fiber and film-forming polyester material selected from the group consisting of:
    (a) poly(ethylene terephthalate),
    (b) poly(1,4-cyclohexylenedimethylene terephthalate), and
    (c) a copolymer of 1,4-cyclohexanedimethanol, poly(tetramethylene glycol) and terephthalic acid
having incorporated therein about 0.005 to about 0.5 weight percent, based upon the weight of said polymeric material, of a fluorescent compound selected from the group consisting of:
    (a) 4,4'-bis(benzoxazol-2-yl)stilbene,
    (b) 4,4'-bis(6-methylsulfonylbenzoxazol-2-yl)stilbene,
    (c) 4,4'-bis(5-methoxybenzoxazol-2-yl)stilbene, and
    (d) 4,4'-bis(6-chlorobenzoxazol-2-yl)stilbene.

4. A normally solid, fiber and film-forming polyolefin selected from the group consisting of:
    (a) polyethylene,
    (b) polypropylene, and
    (c) polyallomer
having incorporated therein about 0.005 to about 0.5 weight percent, based upon the weight of said polyolefin, of a fluorescent compound selected from the group consisting of:
    (a) 4,4'-bis(benzoxazol-2-yl)stilbene,
    (b) 4,4'-bis(6-methylsulfonylbenzoxazol-2-yl)stilbene,
    (c) 4,4'-bis(5-methoxybenzoxazol-2-yl)stilbene, and
    (d) 4,4'-bis(6-chlorobenzoxazol-2-yl)stilbene.

5. A normally solid fiber and film-forming cellulose ester material selected from the group consisting of:
    (a) cellulose acetate,
    (b) cellulose triacetate,
    (c) cellulose acetate butyrate, and
    (d) cellulose propionate having incorporated therein about 0.005 to about 0.5 weight percent, based upon the weight of said cellulose ester material, of a fluorescent compound selected from the group consisting of:

(a) 4,4′-bis(benzoxazol-2-yl)stilbene,
(b) 4,4′-bis(6-methylsulfonylbenzoxazol-2-yl)stilbene,
(c) 4,4′-bis(5-methoxybenzoxazol-2-yl)stilbene, and
(d) 4,4′-bis(6-chlorobenzoxazol-2-yl)stilbene.

6. A normally solid fiber and film-forming polyamide material having incorporated therein about 0.005 to about 0.5 weight percent, based upon the weight of said polyamide material, of a fluorescent compound selected from the group consisting of:

(a) 4,4′-bis(benzoxazol-2-yl)stilbene,
(b) 4,4′-bis(6-methylsulfonylbenzoxazol-2-yl)stilbene,
(c) 4,4′-bis(5-methoxybenzoxazol-2-yl)stilbene, and
(d) 4,4′-bis(6-chlorobenzoxazol-2-yl)stilbene.

7. A normally solid fiber and film-forming polyacrylonitrile material selected from the group consisting of:

(a) polyacrylonitrile, and
(b) a mixture of poly(N-isopropylacrylamide) and a copolymer of acrylonitrile and vinylidene chloride having incorporated therein about 0.005 to about 0.5 weight percent, based upon the weight of said polyacrylonitrile material, of a fluorescent compound selected from the group consisting of:

(a) 4,4′-bis(benzoxazol-2-yl)stilbene,
(b) 4,4′-bis(6-methylsulfonylbenzoxazol-2-yl)stilbene,
(c) 4,4′-bis(5-methoxybenzoxazol-2-yl)stilbene, and
(d) 4,4′-bis(6-chlorobenzoxazol-2-yl)stilbene.

8. Poly(ethylene terephthalate) having incorporated therein about 0.01 to about 0.05 weight percent based upon the weight of said poly(ethylene terephthalate), of 4,4′-bis(benzoxazol-2-yl)stilbene.

9. Poly(1,4-cyclohexylenedimethylene terephthalate) having incorported therein about 0.01 to about 0.05 weight percent, based upon the weight of said poly(1,4-cyclohexylenedimethylene terephthalate), of 4,4′-bis(benzoxazol-2-yl)stilbene.

10. Polyethylene having incorporated therein about 0.01 to about 0.05 weight percent, based upon the weight of said polyethylene, of 4,4′-bis(benzoxazol-2-yl)stilbene.

11. Polypropylene having incorporated therein about 0.01 to about 0.05 weight percent, based upon the weight of said polypropylene, of 4,4′-bis(benzoxazol-2-yl)stilbene.

12. Polyallomer having incorporated therein about 0.01 to about 0.05 weight percent, based upon the weight of said polyallomer, of 4,4′-bis(benzoxazol-2-yl)stilbene.

13. Cellulose acetate having incorporated therein about 0.01 to about 0.05 weight percent, based upon the weight of said cellulose acetate, of 4,4′-bis(benzoxazol-2-yl)stilbene.

14. Cellulose triacetate having incorporated therein about 0.01 to about 0.05 weight percent, based upon the weight of said cellulose triacetate, of 4,4′-bis(benzoxazol-2-yl)stilbene.

15. Cellulose acetate butyrate having incorporated therein about 0.01 to about 0.05 weight percent, based upon the weight of said cellulose acetate butyrate, of 4,4′-bis(benzoxazol-2-yl)stilbene.

16. A mixture of poly(N-isopropylacrylamide) and a copolymer of acrylonitrile and vinylidene chloride having incorporated therein about 0.01 to about 0.05 weight percent, based upon the weight of said mixture, of 4,4′-bis(benzoaxazol-2-yl)stilbene.

17. An optically brightened fiber consisting essentially of a normally solid fiber-forming polymeric material having incorporated therein about 0.005 to about 0.5 weight percent, based upon the weight of said polymeric material, of a fluorescent compound of the formula:

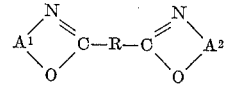

in which R is a bivalent 4,4′-stilbene radical and each of $A^1$ and $A^2$ is an o-phenylene radical.

18. An optically brightened polyester fiber consisting essentially of a normally solid fiber-forming polyester material having incorporated therein about 0.005 to about 0.5 weight percent, based upon the weight of said polyester, of a fluorescent compound of the formula:

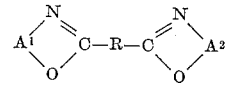

in which R is a bivalent 4,4′-stilbene radical and each of $A^1$ and $A^2$ is an o-phenylene radical, the fluorescent compound having been incorporated into the polyester prior to the spinning of the fiber.

19. An optically brightened polyester fiber consisting essentially of poly(ethylene terephthalate) having incorporated therein about 0.01 to about 0.05 weight percent, based upon the weight of said polyester, of 4,4′-bis(benzoxazol-2-yl)stilbene, the 4,4′-bis(benzoxazol-2-yl)stilbene having been incorporated into the poly(ethylene terephthalate) prior to the spinning of the fiber.

20. An optically brightened polyester fiber consisting essentially of poly(1,4-cyclohexylenedimethylene terephthalate) having incorporated therein about 0.01 to about 0.05 weight percent, based upon the weight of said polyester, of 4,4′-bis(benzoxazol-2-yl)stilbene, the 4,4′-bis(benzoxazol-2-yl)stilbene having been incorporated into the poly(1,4-cyclohexylenedimethylene terephthalate) prior to the spinning of the fiber.

References Cited

UNITED STATES PATENTS 2,838,504  6/1958  Crounse _____ 260—240
3,133,916  5/1964  Duennenberger et al.
                                    252—301.2

FOREIGN PATENTS 641,426  4/1964  Belgium.
578,303  6/1959  Canada.
856,319  12/1960  Great Britain.

TOBIAS E. LEVOW, Primary Examiner.

MAURICE A. BRINDISI, Examiner.

R. D. EDMONDS, Assistant Examiner.